US012617119B2

(12) United States Patent
Michaud

(10) Patent No.: US 12,617,119 B2
(45) Date of Patent: May 5, 2026

(54) COMPUTER-ASSISTED SHINGLE SAWING METHOD AND INSTALLATION

(71) Applicant: Clair Industrial Development Corporation Ltd., Clair (CA)

(72) Inventor: Pierre Michaud, Clair (CA)

(73) Assignee: CLAIR INDUSTRIAL DEVELOPMENT, Clair (CA)

( * ) Notice: Subject to any disclaimer, the term of this patent is extended or adjusted under 35 U.S.C. 154(b) by 25 days.

(21) Appl. No.: 18/371,394

(22) Filed: Sep. 21, 2023

(65) Prior Publication Data

US 2024/0025074 A1 Jan. 25, 2024

Related U.S. Application Data

(63) Continuation of application No. 17/300,060, filed on Feb. 26, 2021, now Pat. No. 11,813,767.

(51) Int. Cl.

*B27B 31/00* (2006.01)
*B27B 31/06* (2006.01)
*E04D 1/20* (2006.01)
*E04G 23/02* (2006.01)

(52) U.S. Cl.

CPC .............. *B27B 31/06* (2013.01); *E04D 1/205* (2013.01); *E04G 23/0281* (2013.01); *Y10T 83/155* (2015.04)

(58) Field of Classification Search

CPC ... Y10T 83/155; Y10S 83/92; E04G 23/0281; B27B 31/06; B27B 31/00; B27B 5/02; B27B 5/04; E04D 1/205; B27C 9/00

See application file for complete search history.

(56) References Cited

U.S. PATENT DOCUMENTS

| | | | | |
|---|---|---|---|---|
| 230,070 | A | 7/1880 | Schermerhorn | |
| 2,136,622 | A | 11/1938 | Koski | |
| 2,965,531 | A | 12/1960 | Barker | B27M 3/02 156/257 |
| 3,390,757 | A | 7/1968 | Edwards et al. | |

(Continued)

OTHER PUBLICATIONS

CSA, CAN/CSA 0118.2-94 (0118.2-94) Eastern White Cedar Shingles, Jul. 15, 1994, Quebec Lumber Manufacturers Association, Canada.

(Continued)

*Primary Examiner* — Phong H Nguyen

(74) *Attorney, Agent, or Firm* — Norton Rose Fulbright Canada LLP

(57) ABSTRACT

A computer-assisted shingle sawing method for recovery optimization using a 0-1 defect relative to the clear line, comprising the steps of taking an image of a next slab to be cut from a wood block; defining from that image, a clear line there-across; and locations of defect on that slab relative to the clear line, determining edge lines of shingles recoverable from the slab according to optimal shingle grade recovery; sawing the next slab along these edge lines, and sawing the next slab from the wood block, thereby releasing an optimum recovery of shingles from the slab. In another aspect there is provided a method for shingle recovery optimization using an optimization by inversion strategy, wherein the inclination of a parting line for cutting the next slab from the wood block is determined for optimal shingle grade recovery. There is also provided an installation for carrying out these methods.

4 Claims, 5 Drawing Sheets

(56) References Cited

U.S. PATENT DOCUMENTS

| | | | | |
|---|---|---|---|---|
| 3,457,978 | A | 7/1969 | Ahlstedt | |
| 4,139,035 | A | 2/1979 | Bystedt et al. | |
| 4,262,572 | A | 4/1981 | Flodin | |
| 4,294,149 | A | 10/1981 | Olsson | |
| 4,300,836 | A | 11/1981 | Holmes | G01B 11/2518 250/202 |
| 4,325,421 | A | 4/1982 | Janovick et al. | |
| 4,327,789 | A | 5/1982 | Reuter | B27B 31/04 144/367 |
| 4,345,630 | A | 8/1982 | Bockwinkel | E04C 2/12 144/346 |
| 4,586,612 | A | 5/1986 | Oberg | B23Q 7/16 198/453 |
| 4,665,786 | A | 5/1987 | Shields | |
| 4,887,219 | A | 12/1989 | Strauser | B07C 5/14 700/167 |
| 5,915,429 | A | 6/1999 | Pelletier | B27B 1/00 144/178 |
| 6,412,382 | B1 * | 7/2002 | Conley | B26D 5/08 83/488 |
| 8,113,098 | B1 | 2/2012 | Longfellow | |
| 9,199,385 | B2 * | 12/2015 | Crookston | B26D 1/30 |
| 2010/0263322 | A1 | 10/2010 | Rule | |

OTHER PUBLICATIONS ckshingle.com, Maine Made Cedar Shingles, https://www.youtube.com/watch?v=gpd3ZOol7kk; Sep. 4, 2010, Accessed online on Jun. 8, 2025.

* cited by examiner

COMPUTER-ASSISTED SHINGLE SAWING METHOD AND INSTALLATION

This is a Continuation application of application Ser. No. 17/300,060, filed on Feb. 26, 2021.

FIELD OF THE PRESENT INVENTION

The present invention pertains to the field of shingle sawing, and more particularly, it pertains to a shingle sawing method and installation using a computer-assisted machine including machine vision and a grade selection algorithm.

BACKGROUND OF THE PRESENT INVENTION

The shingle sawing profession is perhaps the most demanding one in the field of forest industries. A shingle sawyer must be capable of picking up a cedar slab laid against a large vertical rotating saw without looking, and trim both sides of this slab on a nearby table saw. The trimming is done by trimming a first edge, flipping the slab over and trimming the other edge. The trimming is done while watching the main saw; periodically readjusting the cedar block on the main saw's carriage and releasing the carriage's back and forth motion for sawing another slab and repeating the motion.

The trimming on the table saw is done to produce the best available width for a top-quality grade of shingles, or a best available width for a second or third grade of shingles depending on the market demand at that time. A shingle sawyer must pay attention to his work at all times. A shingle sawyer cannot let his mind wander away for a second as most people do when doing monotonous job. Therefore, the rumour is true; you can recognize a long-time shingle sawyer by counting his/her remaining fingers.

It becomes more and more difficult to find workers who want to enter the profession. New generation sawyers are not as productive as their elders. Five years ago, a good shingle sawyer was producing on average 22-23 squares of shingles per eight-hour shift. A square of shingles is 100 square feet. Today, a good shingle sawyer produces on average 15-16 squares per eight-hour shift. Therefore, there is a need in the industry for robotic or computer-assisted machinery to fulfil the void left by the unavailability of workers in this field.

There are, however, major difficulties to overcome in the sawing of shingles by computer-assisted machines. The grade selection standard for wood shingle requires visual acuity, a subjective interpretation of dozens of quality criteria, and a keen decision-making ability that is difficult to match by a computer. It will be appreciated that the grade-selection standards for wood shingles have not been written for interpretation by a computer. For example, some of the grade selection criteria for one grade of wood shingle are listed below.

CAN/CSA 0118.2-94 (0118.2M-94) Eastern White Cedar Shingles.

Extra-Grade A:

- Grading: This grade has a clear face which allows the following characteristics:
- Grain: Diagonal grain is accepted when the grain diverges or slants 1 inch or less in 4 inches of length measured from the butt.
- Sapwood: Accepted above the clear line, 8" (203 mm) from the butt.
- Decay: Not accepted, including the butt and the exposed edges.
- Pin Knots: They refer to ingrown knots of 1⁄16" (1.5 mm); are accepted above the clear line, 8" (203 mm) from the butt.
- Edges: Shingles widening at the tip are not accepted. They must possess parallel sides, within ¼" (6 mm)
- Length: Length shall not exceed ¼" (6 mm) less than nominal length, except a minus tolerance of 1 inch below nominal length is permitted in fifteen (15%) of the running inches in the bundle, from 15" to 15¾" (380 to 400 mm) Feather tips shall be permitted.
- Shingle thickness: At time of manufacturing, shingles should be reasonably uniform in thickness. The approximative thickness of a 16" (406 mm) shingle must follow the 5/2 rule, i.e., the thickness of the butts of 5 shingles must measure about 2" (50 mm) plus or minus 5%.
- Width: The minimum width is 3" (76 mm), with no more than 20% of the running inches (running millimetres) of the bundle consisting of shingles of 3½ in (89 mm) and less.
- Torn grain: Accepted on 10% of the running inches (max. 1⁄16"/1.5 mm long).
- Waves: Accepted on 10% of the running inches, when judged "abnormally visible".
- Shingles that have any slight deviation from the Grade A criteria are classified in other classifications:

CLEAR—Grade B:

SECOND CLEAR—Grade C;

CLEAR WHITE—Brown Label, or

UTILITY (cull)—Grade D.

These secondary grades accept some relaxations to the Grade A criteria, with added tolerable defects related to check and ring shake; wane; inclination of grain; soundness of knots; inter-grown knots; black knots; encased knots; loose knots; unsound knots; holes; bark; streaks of resin; decay; and in the relative location of knots, holes, resin, bark, or decay to the clear line of the shingle.

It will be appreciated that a major portion of these criteria are determined subjectively. These criteria are not related to 1 and 0 defect determinations, as it is done by a computer. A good shingle sawyer normally does an apprenticeship as a bundle maker for a thousand hours or more to develop skills in learning shingle quality criteria. After this first apprenticeship, the sawyer works under a close supervision of a senior sawyer for another thousand hours or more. Only then, an apprentice can become an accomplished shingle sawyer.

For all these reasons, basically, past attempts to manufacture wood shingle using robotic machinery and machine vision have enjoyed a limited success. There remains, more than ever, a need in the industry to address computer-assisted shingle sawing.

For reference purposes, conventional shingle sawing is done on machines that are substantially similar to the one illustrated in; U.S. Pat. No. 2,136,622 issued to M. W. Koski on Nov. 15, 1938. A block of wood is placed by hand between a pair of spur rolls. The spur rolls are mounted on a carriage that carries the wood block against a main saw, to cut one shingle at every pass. The spur rolls index the block so that a thick end of the shingle is taken sequentially from the top of the block, and then from the bottom on the block. The machine illustrated in this document is special in that a pair of trimming saws are provided to cut the shingle at an exact length and to cut the top and bottom ends of the shingle parallel with each other. This trimming is done as the block moves into the main saw.

U.S. Pat. No. 8,113,098 issued to J. L. Longfellow on Feb. 14, 2012. This document describes a machine vision system to determine optimal saw cut to maximize the value of shingles. Wood slabs are exposed to a camera, and a computer determines where the defects are. The shingle is then processed through an edger to trim it to remove any undesired defect.

It will be appreciated that a defect in a shingle does not necessary means that the shingle should be classified as cull. It does not always mean that the defect should be removed. Experience sawyers consider all defect criteria at a glance such as defect soundness, dimensions, relative location, and decide where to trim a slab to recover the best shingle value from it.

Therefore, it is believed that there is a need in the shingle industry for a computerize system and a machine that can match the skills of, or at least obtain a same recovery as, an experienced sawyer.

SUMMARY OF THE PRESENT INVENTION

In the present invention, there is provided a computer-assisted shingle sawing method and installation where shingle grading is done using 0 and 1 defect determinations, relative to a one-line-one-window algorithm.

Broadly speaking, in a first aspect of the present invention, there is provided a computer-assisted shingle sawing method comprising the steps of taking an image of a next slab to be cut from a wood block; defining from that image, visible and covered portions of shingles recoverable from the next slab; determining from the visible and covered portions, edge lines of shingles recoverable from the next slab, according to optimal shingle grade recovery; sawing the next slab along these edge lines, and sawing the next slab from the wood block, thereby releasing an optimum recovery of shingles from the slab.

Testing of this method using 0 and 1 defect determinations, relative to a one-line-one-window algorithm, has demonstrated that it is possible to replace the subjectivity of a human sawyer, using this method, to manufacture high quality wood shingles.

In another aspect of the present invention, there is provided a computer-assisted shingle sawing method comprising the steps of: taking an image of a next slab to be cut from a wood block; determining from that image, an inclination of the next parting line of that next slab from the wood block according to optimal shingle grade recovery and parting the next slab from the wood block along that inclination.

This method is referred to as optimization by inversion. This method has shown increased product recovery over 100%, in reference to what was thought possible using conventional shingle sawing.

In yet another aspect of the present invention, there is provided a computer-assisted shingle sawing installation, comprising: a wood block indexing carriage, configured for holding and indexing a wood block mounted thereon; a camera mounted adjacent to the carriage; the carriage being also configured for presenting an image of a slab to be taken from the wood block to the camera; a trimming saw mounted adjacent to said carriage and being configured, in cooperation with a movement of said carriage, for cutting edge lines of shingles to be recovered from said slab; a computer for analysing the image and for guiding the trimming saw according to an analysis of said image; a chipping head mounted to and movable along a two-axis structure mounted adjacent the carriage; a main saw for cutting the slab from the wood block; this chipping head and the two-axis structure being configured for squaring off all four edges of the slab prior to moving the slab into the main saw.

In a further aspect of the present invention, there is provided a computer-assisted shingle sawing method comprising the steps of: taking an image of a next slab to be cut from a wood block; determining from that image and from optimal wood product recovery values, a thickness of the next slab to be cut from the wood block, and an inclination of the parting line of the next slab, and parting the next slab from the wood block to that thickness and along that inclination.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the computer-assisted shingle sawing method according to the present invention is described with the aid of the accompanying drawings, in which like numerals denote like parts throughout the several views.

DETAILED DESCRIPTION OF THE PREFERRED EMBODIMENT

The preferred embodiment of the computer-assisted shingle sawing method and installation according to the present invention is described herein below with reference to the attached drawings. The drawings presented herein schematic in nature and should not be scaled.

Many components of the preferred installation were not illustrated to facilitate the understanding of the basic concept of the design and method. The components that were not illustrated are those for which the nature, mountings and functions would be obvious to the person skilled in the art of forestry equipment and machines.

The installation according to the preferred embodiment for carrying the method of the present invention is also described in term of its operation and the function of its components. The physical dimensions, material types, and manufacturing tolerances are not provided because these details also do not constitute the essence of the present invention and would be considered obvious to the skilled artisan having acquired the knowledge that is actually provided herein. The preferred embodiment of the method of computer-assisted sawing will be explained herein below, in terms of steps using the preferred shingle sawing installation 20.

Figure 1:
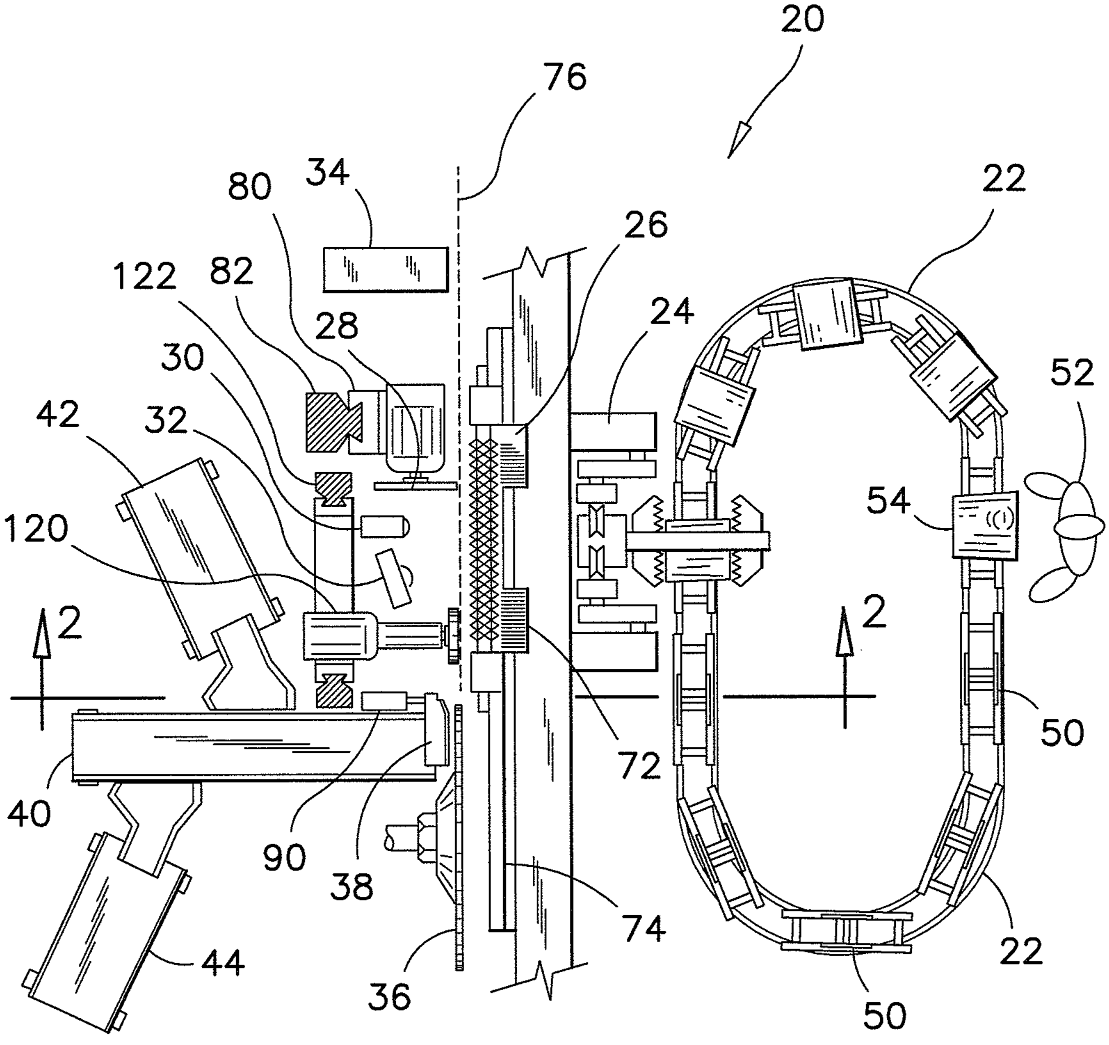
FIG. 1 is a partial plan view of a computer assisted shingle sawing installation that will be used to explain the method according to the present invention.

Referring to FIG. 1, the preferred shingle sawing installation 20, comprises a cedar block inflow carrousel 22, a cedar block loading mast 24, a cedar block indexing carriage 26, a trimming saw 28, a camera, 30, a scanner 32, a computer 34, a main saw 36, a shingle separator 38, an outflow conveyor 40 and two grade-packaging conveyors 42, 44.

Figure 4:
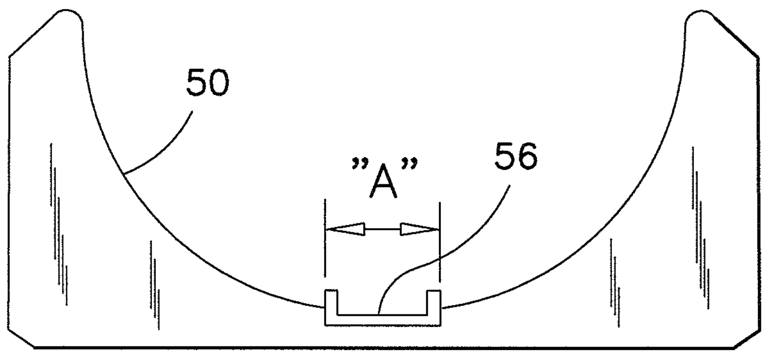
FIG. 4 is a partial side view of one of the cedar blocks carrying saddles on the inflow carrousel.

The inflow carrousel 22 has a series of saddles 50 and buggies mounted thereon on a circular chain. An operator 52 loads the saddles 50 with cedar block 54. Each saddle 50 preferably has U-shape sides as can be seen in FIG. 4, with a gauge 56 in the central portion thereof. The gauge 56 shows a distinct spacing "A" of 3 inch for example, that is indicative of a first cut to be taken by the main saw 36 when the block sitting on this saddle 50 is transferred to the indexing carriage 26 and passed through the main saw 36 for a first time. The spacing "A" in this case represent a minimum width of a shingle. Therefore, this gauge 56 is useful to the operator 52, for positioning a cedar block 54 in a best angular placement on the saddle 50 in order to obtain a best first cut and best subsequent cuts from the block.

Figure 2:
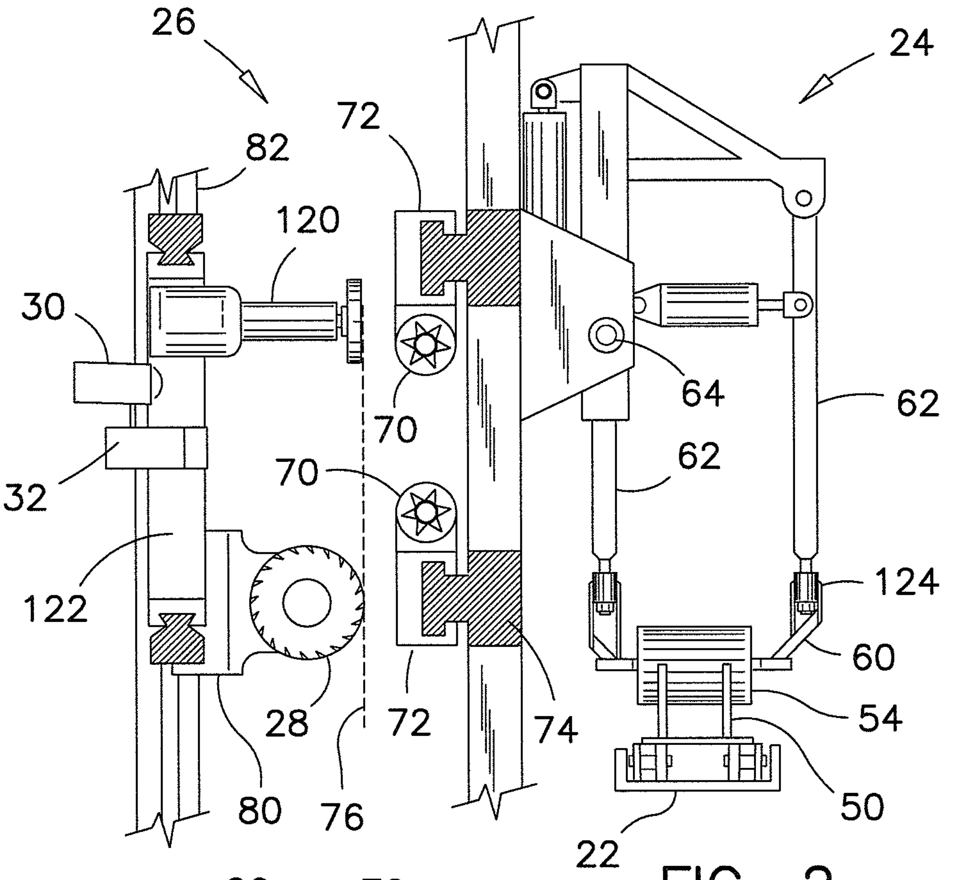
FIG. 2 is a partial cross-section view of the cedar block loading mast as seen along line 2-2 in FIG. 1, in a block-picking position.
Figure 3:
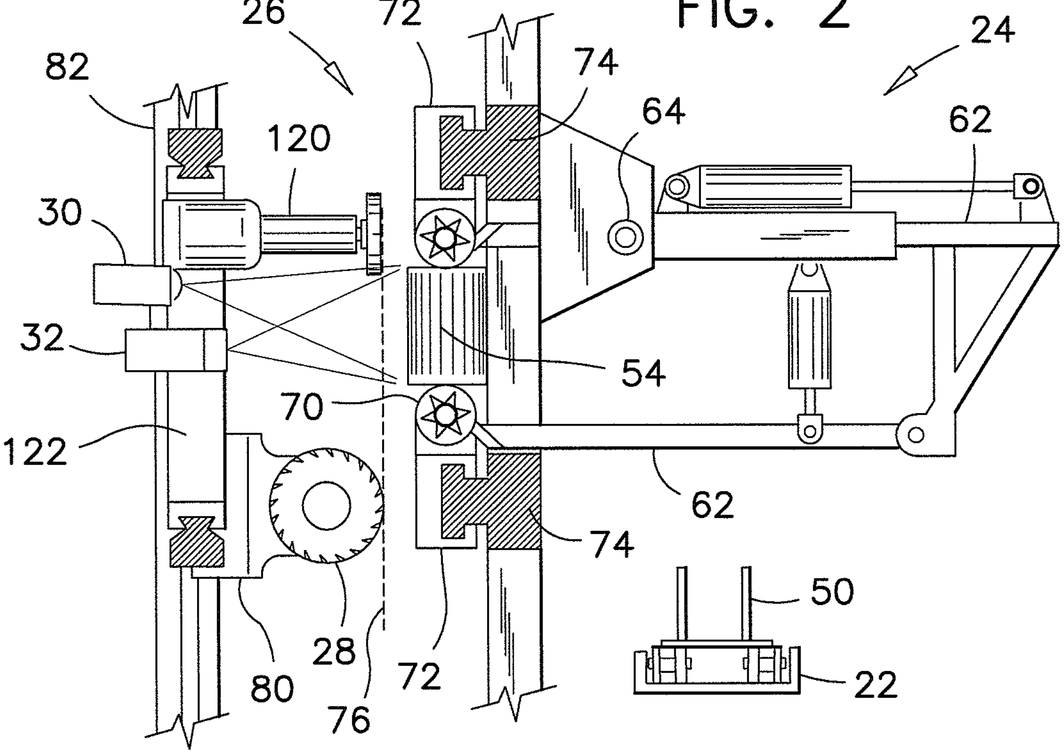
FIG. 3 is another partial cross-section view of the cedar block loading mast as seen along line 2-2 in FIG. 1, in a block-releasing position.

Referring now to FIGS. 2 and 3, the cedar block loading mast 24 will be described. The loading mast 24 has a pair of grippers 60 mounted on arms 62, for gripping the ends of a cedar block 54 sitting on the carrousel 22. The arms 62 are movable away and toward each other, upward and then tilted in a counterclockwise direction about pivot 64 to introduce the block between a pair of indexing spur rollers 70, as illustrated in FIG. 3. These indexing spur rollers 70 are mounted on a carriage 26, represented by bearing blocks 72 and rails 74.

Referring again to FIG. 3. The cedar block 54 as firstly held in the indexing rollers 70, is seen by the camera 30 and the scanner 32. The images obtained by these instruments are sent to the computer 34 for analysis. This analysis includes the location of the edges (landings) of the slab to be cut in the next pass through the main saw 36. This analysis includes instructions to move the trimming saw 28 up and down two or more times to cut the cedar block 54 to a depth equivalent to the kerf 76 of the main saw 36 as is indicated by dashed line 76 in FIG. 1.

The trimming saw 28 is mounted on a vertical slide which is represented by bearing block 80 and rail 82. It will be appreciated that the positioning of the cedar block 54 to align the landings and edge lines with the trimming saw 28 is done by the carriage 26.

Figure 5:
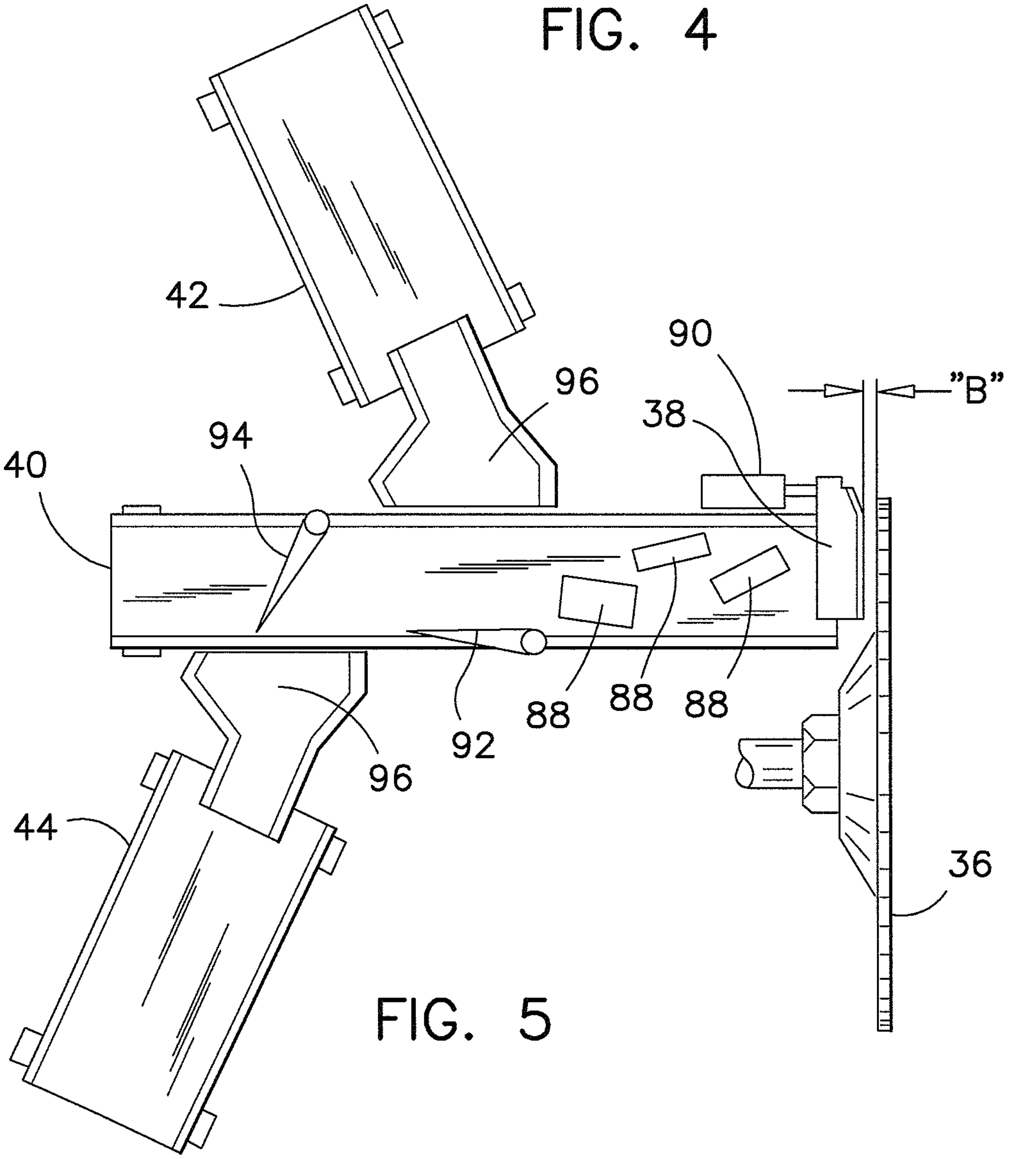
FIG. 5 is a partial view of the main saw and a partial plan view of the outflow conveyor.

Referring now to FIGS. 1 and 5, the separation of shingles will be explained. In the preferred embodiment of the computer-assisted shingle sawing method, every cut by the main saw 36 can release up to 4 shingles from the cedar block 54 and the minimum width of each shingle is 3 inches. As the cedar block 54 moved into the main saw 36, the shingles 88 are released from the block 54 in sequence. This sequence is known by the main computer 34. As each shingle 88 is cut and released, it falls down on a belt conveyor 40. A separator chute, or deflector 38, articulated or not, facilitates the separation of shingles 88 as distinct elements on the conveyor 40. The outflow conveyor 40 may also be indexed to facilitate this separation. The carriage 26 may also slow down or hold back at each edge line to help the separation of shingle falling from the main saw 36. Also, the outflow conveyor 40 may operate on a slow-and-go mode during each cut to facilitate the release of each shingle 88 as single element on the belt.

Also, in reference to FIG. 5, the deflector 38 is preferably set as a distance "B" from the main saw to allow splinters and edging to fall down under the conveyor 40, for separating these shingle by-products from shingles 88. An actuator 90 is preferable provided to adjust this gap "B" when the thin end of the shingle 88 is pointing downward.

The outflow conveyor 40 comprises at least two deflectors 92, 94 moving the shingles 88 toward one of the chutes 96. Each chute 96 move the shingles 88 into one of the packaging conveyors 42, 44 according to their grades, as known by the main computer 34.

The shingles carried to the end of the outflow conveyor 40 are considered not suitable for any of the commercial GRADE A or GRADE B. Operators (not shown) posted at the end of the packaging conveyors 42, 44 manually package the shingles delivered thereat according to a conventional method.

Having explained the operation of the preferred installation 20, the preferred method for computer-assisted shingle sawing method and corresponding algorithm can now be described, while referring to FIGS. 6-12.

Figure 6:
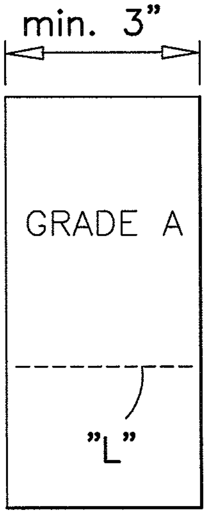
FIG. 6 is a representation of a Grade A shingle.

For reference purposes, FIG. 6 is a Grade A shingle, clear of any visual defect. Grade A shingle have the greatest market value. A minimum width is 3 inches. The market value increases in proportion to its width.

Figure 7:
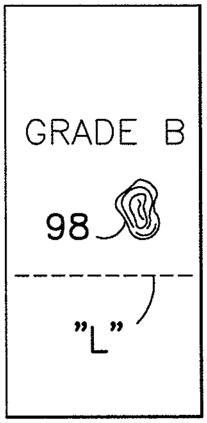
FIG. 7 is a representation of a Grade B shingle.

A Grade B shingle, as in FIG. 7, tolerate a defect above the exposed portion thereof. As can be noted, the defect 98 is located above the line of exposure "L" of the shingle, usually 6 inches (15.2 mm) from the butt.

Figure 8:
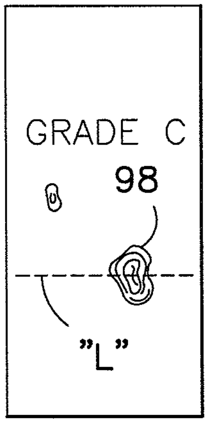
FIGS. 8 and 8A are representations of a same shingle being classified as Grade C in FIG. 8 and Grade B in its rotated image of FIG. 8A.

A Grade C shingle as shown in FIG. 8 has one defect extending below the line of exposure "L".

Figure 8A:
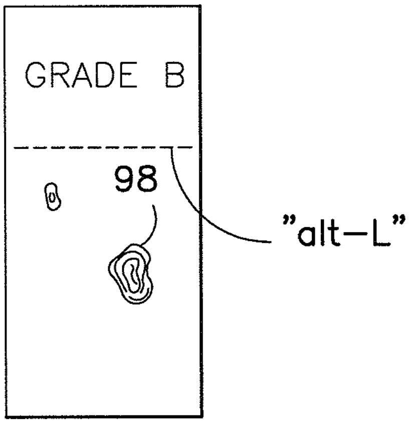

One important aspect of the method according the present invention is that before cutting the shingle shown in FIG. 8, the spur rolls 70 may adjust the angle of the cut on the block 54 so that butt of the shingle and the exposed portion of the shingle is on top of the slab, such as shown in FIG. 8A. By doing so, a Grade C shingle became a Grade B shingle, with a much greater market value.

Figure 9:
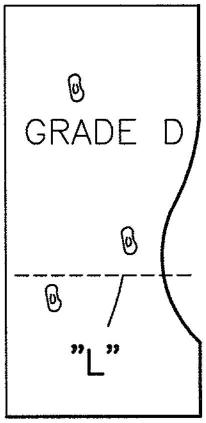
FIG. 9 is a representation of a Grade D shingle.

A Grade D shingle, as illustrated in FIG. 9, has too many defects therein, to be used as shingle and therefore, it is usually trimmed as window/door shim stock.

Figure 10:
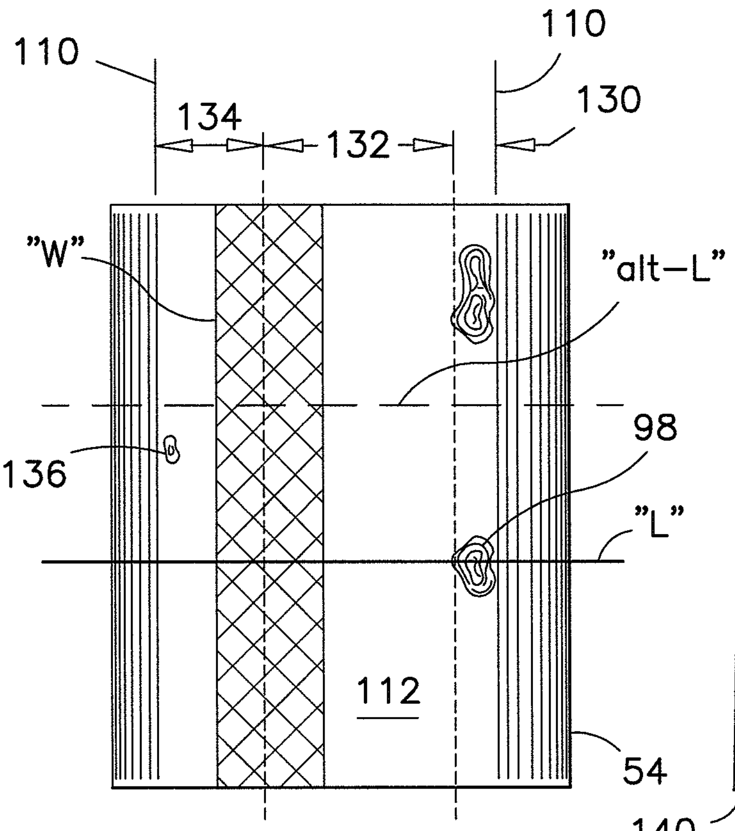
FIG. 10 is an elevation view of a cedar block as seen by the camera of the computer-assisted installation.
Figure 11:
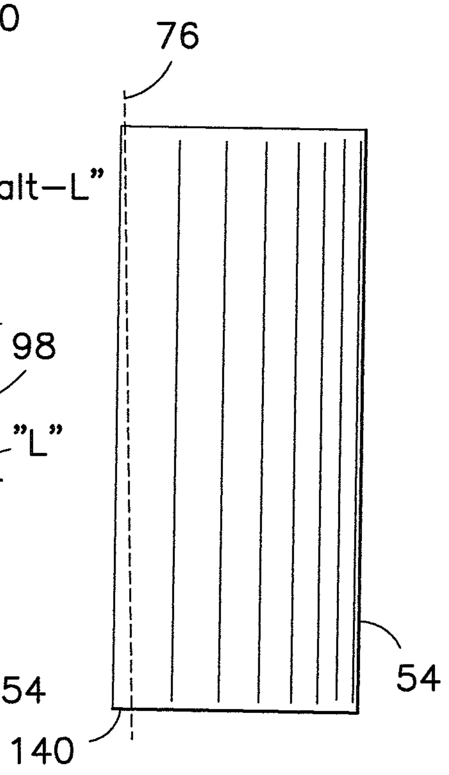
FIG. 11 is a side view of the wood block shown in FIG. 10.

Referring now to FIG. 10, both outside lines 110 represent the outside edges (landings) of the slab 112 to be cut during the next pass into the main saw 36. In the preferred method, the main computer 34 has been programmed to look at the image of the slab 112, and to make 0 or 1 determination of defect(s) in relation of a one-line-one window algorithm, while ignoring all the criteria of the quality standard referred to before in Grade A and Grade B. The algorithm uses two variables:

1) the visible or line of exposure "L" of the shingles to be taken from the block, and
2) a 3-inch wide-full-length window "W" movable across the slab 112.

The computer analyses the images from the machine vision system and scans the face of the slab, inside the window, for the slightest defect. If a defect is found, regardless of their size or gravity, they are identified as a positive digit.

When the sweeping window "W" finds a 3-inch-wide strip with no defect along the full length thereof, this strip is identified as a minimum-width Grade A shingle.

When the sweeping window "W" finds a 3-inch strip with one or more defects above the clear line and no defect below the clear line "L", that strip is identified as a minimum-width Grade B shingle.

When the sweeping window "W" finds a defect below the clear line "L", a trim line is assigned to each side of the defect, and that strip is identified as a cull strip.

During the sweeping of the window "W" across the face of the slab 112, the total available width of each of GRADE A shingle and GRADE B shingle and the location(s) of cull strips are recorded.

The width of both identified shingle grades is sequentially increased by the computer from the data obtained by the sweeping window "W". The width increase is done according to market value of each grade, to obtain optimum recovery value from each slab 112.

The above analysis is repeated with a alternative clear line "alt-L", and a decision is made according to a better recovery between the first and second analysis whether the butt end of the next slab 112 is on top or bottom of the block 54.

Once a determination of shingle Grade and width is done, the cedar block 54 is presented to the trimming saw 28 and moved back and forth along the rails 74 so that trimming can be done along the landings 110 and along the shingles' widths.

Figure 12:
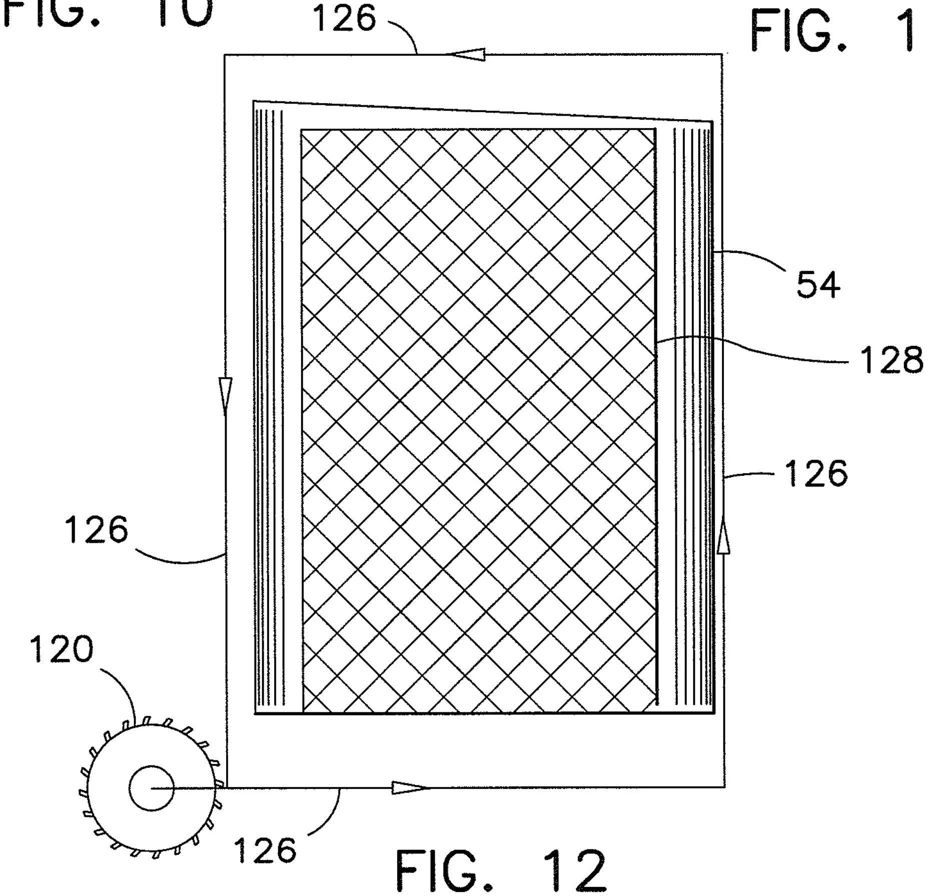
FIG. 12 is a same image as in FIG. 10, after the trimming head has gone around and squared the slab to be cut.

It will be appreciated that lines 110 may be used to guide a second trimming device equipped with a chipping head, for alternatively chipping away the side and top and bottom edges of the slab 112 to be cut. Referring to FIG. 12, such chipping head 120 is illustrated. The chipping head 120 is guided on a two-axis structure 122, as can be seen in FIGS. 1-3. The chipping head 120 is convenient for squaring a slab 112 from a block 54 that has no parallel ends.

For the purpose of loading a trapezoidal block 54, the grippers 60 of the loading arms 62 are equipped with movable wrists 124, as can be seen in FIG. 2.

The movement of the chipping head 120 along its path 126, is synchronized with the movement of the trimming saw 28 so as to not interfere with each other. For example, the chipping head 120 and the two-axis structure 122 are configured for squaring a bottom and right edge of a slab 112, when the trimming saw 28 is indexed near a left upper side of the slab 112, and for squaring the top and left edges of the slab 112 when trimming saw 28 is indexed near a right lower side of the slab 112.

The trimmed slab 128 is advantageous in that most or all the splinters and edging are removed from the slab 128 before the slab 128 is separated from the block 54, thereby limiting all these shingle by-products from accumulating under and near the shingle-sawing installation 20.

Using the above analysis, the slab 112 shown in FIG. 10 was separated as strip 130 classified as a cull strip, for containing one defect 98 in the visible portion of the shingle, and another one in the covered portion. The remaining portion of the slab 112 was separated into a 5 inches wide Grade A—EXTRA shingle 132 for containing 0 defect over its entire surface; and a 3-inch-wide Grade B-CLEAR shingle 134, containing one small defect 136 above the clear line "L" of the shingle.

Referring back to FIG. 11, the wood block 54 is indexed on spur rolls 70 as can be seen in FIGS. 2 and 3. In the machine illustrated herein, the wood block 54 can be indexed up the eight consecutive times with the butt end 140 of the shingle in a same direction relative to the block 54. The computer system 34 has the ability to recognize cases of optimization by inversion as illustrated using FIGS. 8 and 8A and decides of the inclination of the parting line and the location of the butt end of the next shingles for a best recovery.

The example described above was programmed with a market bias of high value for both Grade A and Grade B. However, if the market value for Grade A shingles is much higher than that for Grade B shingles, the market bias introduced in the algorithm would have given a 7-inch-wide Grade A shingle and two cull strips bordering this wider shingle, from the slab 112 of FIG. 10.

This preferred 0-1 defect-one-line-one-window algorithm was introduced to human sawyers. They were asked to test the method. Cedar blocks were selected randomly, sawn and trimmed according to this preferred simplified method. After careful tabulation of the resulting products, it was found that the yield of Grade A and Grade B shingles from these blocks had increased by 20%, and the resultant quality of packaged shingles in both grades had also increased by 20% as compared to conventional sawing using the conventional quality criteria. The income obtained from these test blocks also increased accordingly. These tests indicate that it is possible to replace the subjectivity of a human sawyer, by defect determinations of a computer to manufacture high quality wood shingles.

The above algorithm was explained using Grade A and Grade B shingles only. However, it will be appreciated that when a market demand for Grade C, (decoration shingles) or grade D, (cull or shim stocks) justifies it, these additional Grades can be added to the method according to the present invention, following the same concept as described herein above for the two top grades. More packaging conveyors and corresponding selectors may be added to recover these additional grades. Therefore, the method described herein is not limited to two grades of shingle only.

Similarly, the sweeping window "W" has been specified as being 3 inches wide. The present method should not be limited to this dimension. The method described herein will work with windows that are wider or narrower than 3 inches. A single line will also work.

The examples that have been presented herein pertain to Eastern White Cedar Shingles. It should be appreciated that the advantages described herein are not limited to this popular shingle product. For example, a manufacturer of Eastern White Cedar Shingles, may also have a market demand for cedar shakes which are slightly thicker than cedar shingles. The computer-assisted shingle sawing installation described herein and its optimization by inversion feature, provide the ability to adjust the inclination of the parting line as well as the thickness and orientation of the butt end of a shingle or a shake to be sawn, according to optimal wood product recovery values. Alternate product specifications for shakes for example, can be entered in the computer system and where optimum product recovery value dictates, a shake may be sawn whenever possible amid a run of common white cedar shingles, or vice-versa.

This document has explained grade selection according to market bias. It is believed that there are more advantages to this method that are yet to be developed. For example, the width selection of each shingle can be set according to a desired prescription of one or more standard widths. The width selection can be set to facilitate the formation of prefab shingled panels of exactly 48 inches wide for example. In another case, the width prescription can be set to provide a unique visual pattern on a shingled wall. The width prescription can also be set to facilitate shingle bundling with minimum gaps.

Because the computer determines the grade and width of each shingle and has a memory and control on the location of each shingle; a customer can be provided with a shingle selection, quality and width prescription that were unheard of before. The full potential of this method is yet to be developed, and therefore, the present description should not be limiting the scope of the present examples.

What is claimed is:

1. A computer-assisted shingle sawing method comprising:

taking an image of a shingle to be cut from a wood block;

determining from said image, an exposure line on said shingle, said exposure line defining an exposed portion of said shingle and a covered portion of said shingle;

determining from said image, a location of a defect on said shingle relative to said exposure line; and if said defect is found in said exposed portion of said shingle, adjusting an inclination of said wood block prior to said shingle being cut from said wood block, to orient said shingle in a position where said defect is located in said covered portion of said shingle.

2. A computer-assisted shingle sawing method comprising:

taking an image of a next shingle to be cut from a wood block;

determining from said image a covered portion of said shingle and a position of a defect relative to said covered portion;

determining from said image, prior to said shingle being cut from said wood block, an orientation of said shingle to position said defect in said covered portion of said shingle; and adjusting an inclination of said wood block to obtain said orientation.

3. The computer-assisted shingle sawing method as claimed in claim 2, wherein said orientation defines a location of a thick end of said shingle relative to said defect, for obtaining a best wood recovery value of said wood block.

4. A computer-assisted shingle sawing method comprising:

taking an image of a shingle to be cut from a wood block;

determining from said image an exposed region and a covered region of said shingle and a position of a defect relative to said regions;

determining from said image, prior to said shingle being cut from said wood block, an orientation of said wood block to position said defect in said covered region of said shingle; and adjusting an inclination of said wood block to obtain said orientation.

* * * * *